United States Patent [19]

McClintock

[11] 4,172,365

[45] Oct. 30, 1979

[54] ROLLABLE COOLER

[76] Inventor: George McClintock, 163 Roberts Dr., Anderson, Ind. 46013

[21] Appl. No.: 876,026

[22] Filed: Feb. 8, 1978

[51] Int. Cl.² ............................................. F25D 25/02
[52] U.S. Cl. ............................................ 62/381; 62/457; 62/466; 280/47.31; 296/22; 366/54; 366/57
[58] Field of Search ............... 220/20, 412; 62/457, 62/381, 466, 371, 372, 530, 465; 280/47.31; 296/22; 366/54, 57

[56] References Cited

U.S. PATENT DOCUMENTS

| | | | |
|---|---|---|---|
| 1,165,905 | 12/1915 | Reimann | 366/57 |
| 2,007,154 | 7/1935 | Bowes | 62/371 |
| 2,161,295 | 6/1939 | Hirschberg | 220/412 |
| 3,591,194 | 7/1971 | Vega | 62/457 |
| 3,605,435 | 9/1971 | Taylor | 62/371 |
| 3,734,336 | 5/1973 | Rankow et al. | 206/545 |

Primary Examiner—Ronald C. Capossela
Attorney, Agent, or Firm—Jenkins, Coffey, Hyland, Badger & Conard

[57] ABSTRACT

A cooler for the transportation and cooling of, particularly, canned beverages including a thermally insulated container having an open end and a retainable cover forming a receptacle for the beverages with a spacer means to hold the canned beverages about the periphery of the receptacle and to form, with the surfaces of the canned beverages, a cavity for a cooling agent, the outer surface of the container being adapted to roll with the cover being retained in sealing engagement. Upon transportation by rolling of the cooler the beverages within the cans are cooled by contact between the cooling agent and the can surfaces forming the cavity.

14 Claims, 4 Drawing Figures

ROLLABLE COOLER

This invention is related to a cooler which is adapted for transportation by rolling and more particularly with a rollable cooler adapted for the transportation and cooling of canned beverages.

Existing coolers include chests in a variety of configurations which form a receptacle for the storage of food and beverages and for ice or another cooling agent. Typically such coolers include lids which snap into place or are retained in place with mechanical fasteners or the handles by which they are carried. Special coolers have been disclosed for canned beverages as for example in U.S. Pat. No. 3,436,932, however, the cooler of U.S. Pat. No. 3,436,932, as is typical with the other coolers of the prior art, is transported by lifting and carrying the cooler and its contents. Where the bearer of such coolers must carry them a long distance and where the quantity of materials contained within the cooler is large, the use of such coolers can be very tiring.

This invention provides a cooler that may be transported by rolling rather than by lifting and carrying the cooler. In addition, the cooler of this invention includes features to contribute to the cooling of its contents during such transportation and can provide mixing and chilling of the powdered drink mixes popular with children. Among these features are means internally within the cooler to space and hold about the periphery of the cooler a plurality of containers. Such means can provide a cavity centrally within the cooler for ice or other such cooling agent. Such means can include removable partitions, or other such spacer means, or may be formed in the inner wall of the container itself. Such means may be formed, for example, to accommodate twelve ounce or seven ounce beverage cans, or other standard sized containers. With such means the central cavity of the cooler may be formed by the side walls of the canned beverages so that as the cooler is rolled, the surfaces of the canned beverages will be brought into contact with ice, if that is the cooling agent used, and will be bathed in cold water from the melting ice. In addition, the rolling of the cooler will agitate the beverages within the cans assisting in the cooling of their contents, and where the contents are powdered beverage mixes, assisting in their mixing.

The rollable cooler may be made from such thermally insulating materials as polystyrene or polyurethane foams, which may be given a continuous coating of a thermoplastic material such as polyethylene or polypropylene to form a tough outer coating. A removable cover may be formed which may be conveniently locked to the bottom container portion of the cooler in such a manner to provide adequate sealing engagement to retain the cooling agent.

With this invention a significant number of canned beverages can be easily transported in an effective and relatively small cooler.

Further features and advantages of the invention will be apparent from the following specification and from the drawings in which.

Figure 1:
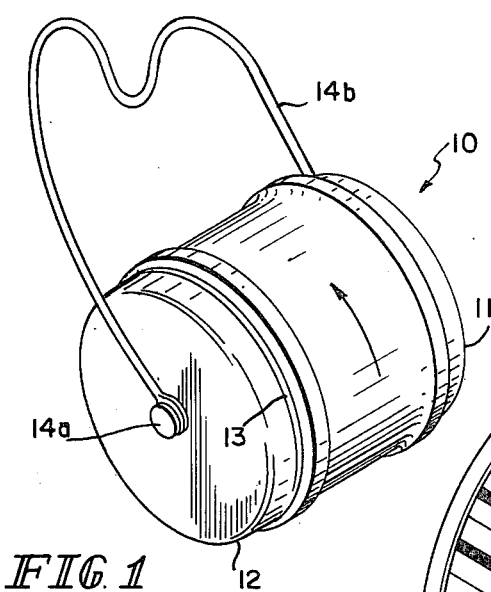
FIG. 1 is a perspective view of a cooler of this invention assembled and ready for transportation by being pulled by a flexible yoke.

Although the cooler described and shown in FIG. 1 has a circumference which is circular, the cooler can have other configurations adapted for rolling, such as a many sided polygon. The cooler includes a container portion 11 having an opening at one end closed by a removable cover 12 which is retained on the container 11 by a threaded engagement, as shown, or by any other convenient cooperation between the container 11 and the cover 12. Where the cover and the container are threadedly engaged, the threaded engagement can provide sufficient sealing engagement of the cover on the container to prevent undue loss of the cooling agent. If necessary, a soft gasket 13 may be carried by the container 11 to seal the opening of the container with the cover 12 engaged.

The cover 12 and the end of the container 11 are provided with threadedly inserted projecting shoulder bolts 14a to provide axles for engagement by the flexible yoke 14b which may be used to pull and roll the cooler 10. The yoke 14b may be a molded rubber cable with elastic bolt-engaging ends, or the cooler 10 may be pulled by other means, such as a length of clothesline with knotted ends.

Figure 2:
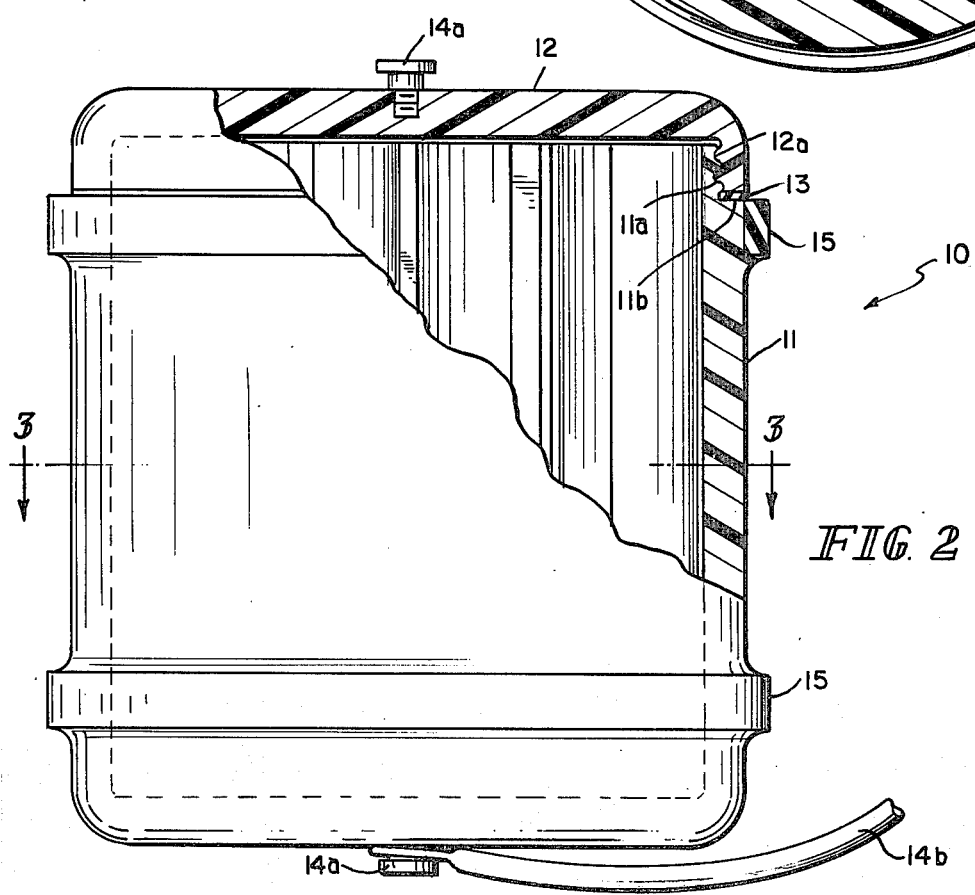
FIG. 2 is a partial cross sectional view of a cooler of this invention.

The container 11 itself may be in the form of a cylindrical receptacle having walls of a thermally insulating material such as a polyurethane or polystyrene foam. To provide additional toughness and lubricity to the surfaces of the container, the thermally insulating material may be provided with a coating of polyethylene or polypropylene. As shown in FIG. 2, the portion of the container 11 adjacent the opening includes a threaded portion 11a adapted for engagement by the removable cover 12 and a flange portion 11b to support a gasket. The container 11 may be provided with detachable roll bands 15, or such roll bands may be formed as an integral part of container 11. Where the container 11 includes roll bands, the circumference of the roll bands themselves may be adapted for rolling while the remaining outer surface of the container 11 may be formed without regard for its ability to be rolled.

As shown in FIG. 2, the cooler includes a gasket 13 carried on a flange 11b of the container 11 to be engaged by the removable cover 12 and thereby seal the opening of the cooler. Such a gasket, however, may be unnecessary where the cover 12 is threadedly connected to the container 11, the threaded engagement itself providing sufficiently sealed engagement of the cooler. If the mating portions of the removable cover 12 and the container 11 are manufactured with sufficiently elastic portions, they may provide sealed engagement of the container with a bayonet twist-lock, lugged interconnection or other such interlocking means, the sealed engagement being formed by the plastic deformation of the lid or the portion of the container adjacent the opening.

Figure 3:
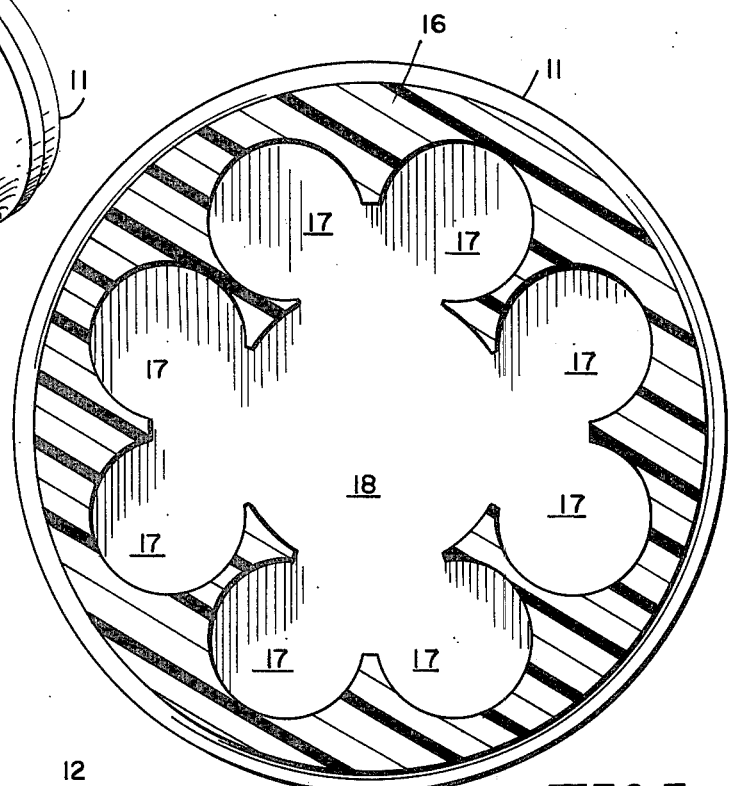
FIG. 3 is a section taken through the center of the cooler along lines 3—3 of FIG. 2.

Within the container 11 beverages or food containers are spaced about the periphery of the receptacle by means 16 to retain them, as shown in FIG. 3. The means 16 provides a plurality of cavities 17 into which the containers may be inserted. The means 16 encompasses portions of the peripheries of the containers and should be formed in such a manner as to encompass a sufficient portion of the periphery of each container to retain it in position; usually more than 180° of a beverage can's periphery is satisfactory. It is preferable that the spacing means not encompass the entire periphery of the cans. As shown in FIG. 3, the means 16 retains the cans in such a manner that portions of the side walls of the cans form the walls of a central cavity 18 into which ice or another cooling agent may be placed. With this arrangement the ice and the cold water resulting from melted ice will be in contact with the surface of the canned beverages themselves and when the cooler is transported by rolling, the canned beverages will be repetitively exposed to contact with the ice or the cold water and the contents of the cans will be agitated, assisting in the cooling of the beverages within the cans. Although FIG. 3 indicates a spacer means 16 which is separate from the container, the spacer means may be formed from thermally insulating material and be an integral part of the container 11.

Figure 4:
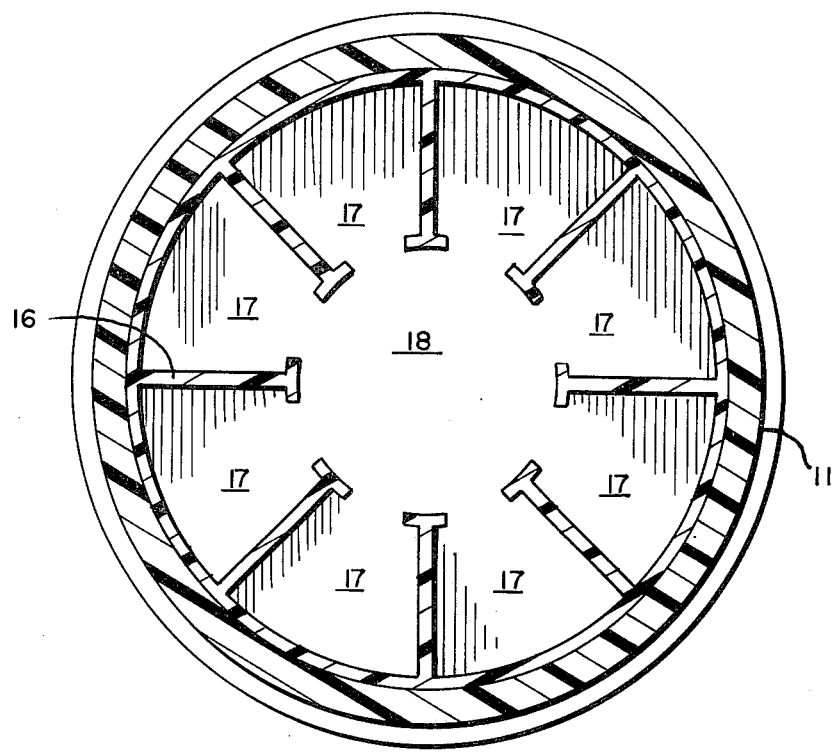
FIG. 4 is another section through the center of the cooler at the same location as line 3—3 of FIG. 2 to indicate another means to hold and space canned beverages within the cooler.

FIG. 3 also indicates the means to hold the canned beverages about the periphery of the cooler to be formed by walls which conform to the periphery of typical cylindrical beverage containers, however, such means may consist of a partitioning means having any shape sufficient to space and retain the beverages around the periphery of the container 11, an example being shown in FIG. 4. A spacer means in the configuration of FIG. 4 may be preferred. Cooling of warm canned beverages may proceed faster with spacer means in the configuration shown in FIG. 4 although such means may not keep the canned beverages cold as long as the means shown in FIG. 3. Of course, whatever the configuration, such means may be made to accommodate containers other than twelve ounce beverage cans, one example being the new seven ounce beverage cans.

A cooler of this invention may form a receptacle having a maximum inner diameter on the order of 12 inches and depth on the order of 10 inches with the spacer dividing the periphery of the receptacle into eight cavities to provide a small but effective cooler capable of transporting 16 twelve ounce canned beverages, and by merely increasing the depth of the receptacle to 15 inches, the cooler may cool and transport 24 twelve ounce canned beverages. It is apparent that coolers using my invention may be made with greater diameters and greater heights to conveniently cool and transport greater quantities of canned beverages and that spacer means may be provided for a variety of container sizes. Other departures from the specific cooler illustrated and described in this patent may be made without departing from the scope of the claims which follow.

I claim:

1. A rollable cooler, comprising a thermally insulated container having an outer surface adapted for rolling, and an opening at one end forming an inner receptacle; first means within the container to hold about the periphery of the inner receptacle a plurality of beverage containers and to provide a central cavity within the container;

a removable cover for said opening, said cover and the portion of the container adjacent said opening being adapted to retain said cover on said container in sealing engagement and to comprise an end of the cooler when in place; and second means to permit the cooler to be transported by rolling on its outer surface.

2. A cooler as set forth in claim 1 wherein said first means forms a plurality of partitions about the periphery of the inner receptacle adapted to engage a portion of the periphery of a plurality of containers, said central cavity being definable in part by the containers being held by said first means.

3. A cooler as set forth in claim 1 wherein said first means has an inner surface forming a plurality of cylindrically shaped cavities, each cylindrically shaped cavity having a circumference with an included angle in excess of 180° but less than 360° and permitting containers held within the cylindrically shaped cavities to form the central cavity.

4. A cooler as set forth in claim 2 wherein the spacer means is made of thermally insulating material.

5. A cooler as set forth in claim 1 wherein the removable cover is threadedly connected to the container.

6. A cooler as set forth in claim 1 wherein the outer surface includes two circumferential projections to serve as roll bands.

7. A cooler as set forth in claim 1 wherein the second means to permit the cooler to be transported by rolling include two threadedly connected shoulder bolts projecting from each end of the container to form axles and adapted for engagement by a yoke.

8. A cooler as set forth in claim 1 wherein the first means is removable from the container.

9. A cooler as set forth in claim 1 wherein the first means is integrally formed with the container.

10. In a cooler for canned beverages including a thermally insulating container having an open end with a retainable cover and forming a receptacle for canned beverages, the improvement comprising a portion of the outer surface of the container being adapted for rolling with the cover being retained in sealed engagement, and a spacer means within the container to hold a plurality of containers in place about the periphery of the receptacle and to form with the surfaces of the containers a central cavity, whereby upon transportation by rolling of the cooler the contents of the containers may be cooled by contact with a cooling agent placed in the central cavity.

11. A cooler as set forth in claim 10 wherein the spacer means is formed integrally with the container and from thermally insulating material.

12. A cooler as set forth in claim 10 wherein the spacer means encompasses each of a plurality of canned beverages and is adapted to space and retain each of the plurality of canned beverages in place.

13. A cooler as set forth in claim 10 wherein the cooler forms a receptacle about 12 inches in diameter and 10 inches deep and the spacer means forms 8 cavities for 16 twelve ounce cans.

14. A cooler as set forth in claim 10 wherein the cooler forms a receptacle about 12 inches in diameter and 15 inches deep and the spacer means forms 8 cavities for 24 twelve ounce cans.

* * * * *